April 19, 1960
H. Y. MAGEOCH
2,933,567
ELECTRIC CONDUCTOR SYSTEM
Original Filed Nov. 4, 1952
2 Sheets-Sheet 1
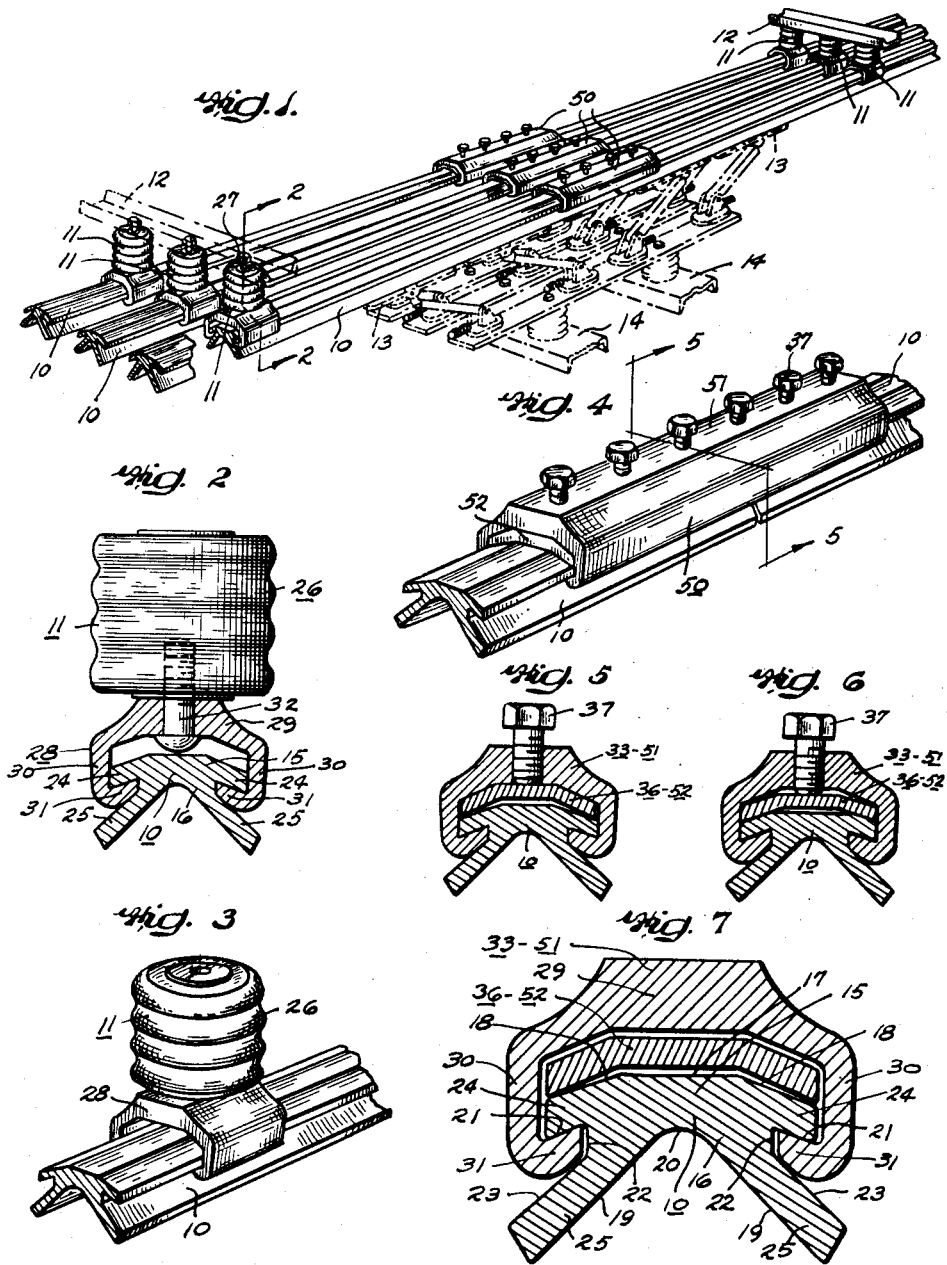
INVENTOR.
HARRY YALE MAGEOCH
BY
ATTORNEY April 19, 1960  H. Y. MAGEOCH  2,933,567
ELECTRIC CONDUCTOR SYSTEM
Original Filed Nov. 4, 1952
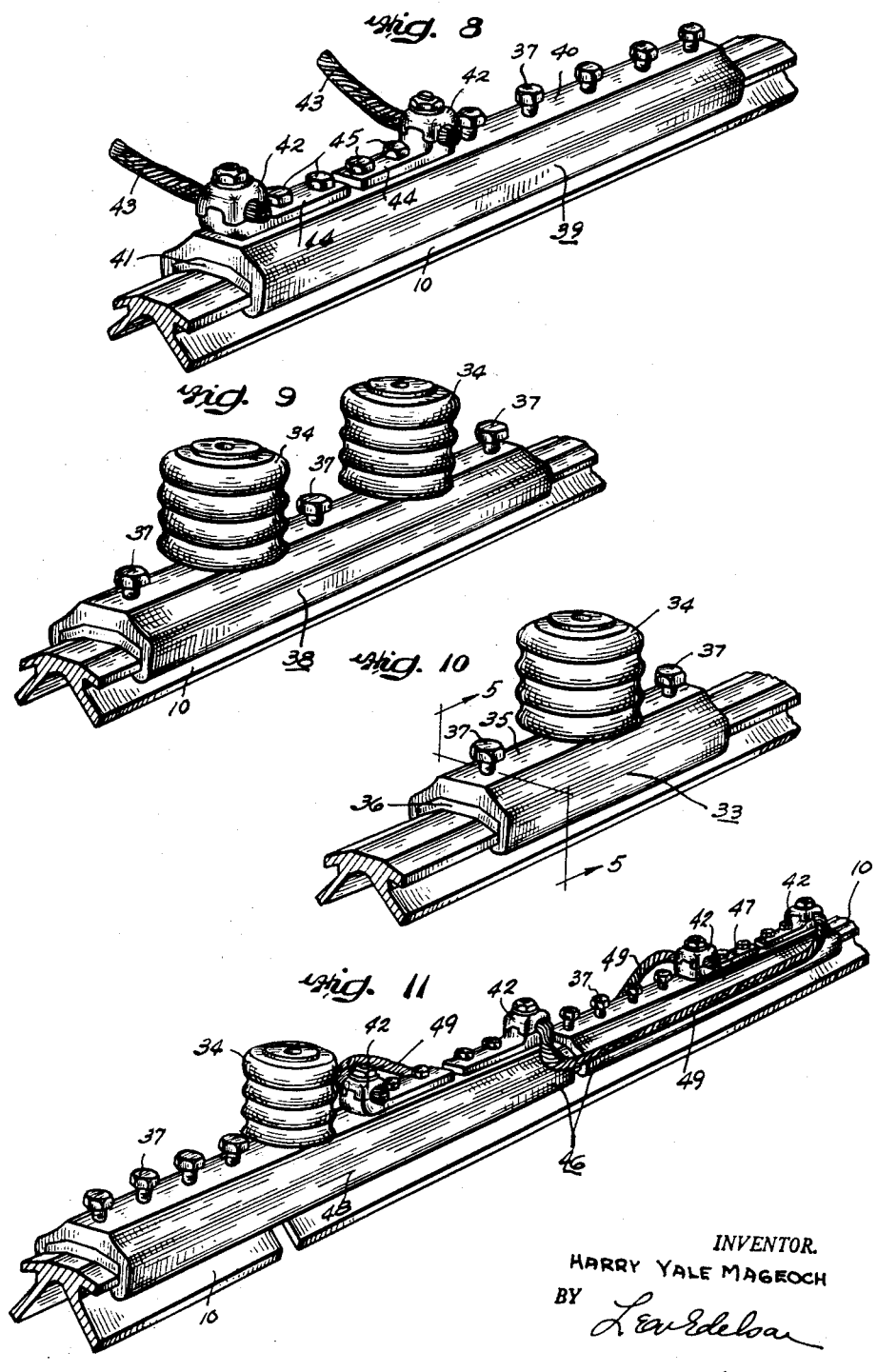

United States Patent Office 2,933,567
Patented Apr. 19, 1960

2,933,567

ELECTRIC CONDUCTOR SYSTEM

Harry Yale Mageoch, Havertown, Pa., assignor to Electric Service Works, Delta-Star Electric Division, H. K. Porter Company (Delaware), a corporation of Delaware Continuation of application Serial No. 318,586, November 4, 1952. This application October 17, 1957, Serial No. 690,857

6 Claims. (Cl. 191—40)

This invention relates generally to electric power conductor systems and is more particularly concerned with a system for conducting electric power to a mobile unit, the instant application being a continuation of copending application Serial No. 318, 586, filed November 4, 1952, now abandoned.

In recent years there has been a gradual and persistent tendency for alternating electric current to supplant direct electric current as the more common power utilized by mobile units, such as traveling cranes. There has been at the same time a tendency for electric power conductor systems that are particularly suited for alternating currents to supplant the steel conductor systems commonly in use and particularly suited for direct currents, the principal reason being that steel conductor systems are subject to the disadvantage that overall impedance, when an alternating current is carried, is very high due principally to the magnetic characteristics of steel.

One type of electric power conductor system which is particularly suited for alternating currents is a conductor system the component parts of which are made of any nonmagnetic current conducting material, typical of which is aluminum, a metal which, for this purpose, possesses many inherent advantages when compared to steel. For example, the electrical conductivity of aluminum is high; the metal is nonmagnetic, thus overall impedance is low when an alternating current is carried; it is light, thus it may be easily and economically handled; complex shapes may be made by extrusion, and the metal is easily machined, which factors afford low manufacturing costs; and, the metal has good corrosion resistance, thus it is simple and easy to maintain.

In spite of the many inherent advantages which an aluminum electric power conductor system affords over a steel system, for carrying alternating currents, known aluminum systems have not proved to be entirely satisfactory because, first, their design and construction result in high installation costs and, second, their service record with respect to maintenance required has been very poor. Consequently, it is a principal object of this invention to provide for a mobile unit a highly efficient, high capacity electric power conductor system which, while designed primarily for alternating currents, may also be advantageously employed for direct current.

Another object of this invention is to provide such a system the essential parts of which are made of a non-magnetic metal.

Still another object of this invention is to provide such a system with highly efficient and novel means providing for joining the sections of the system both electrically and mechanically and providing for the support and expansion of the system.

A further object of this invention is to provide such a system with component parts of such design and relative arrangement as to automatically insure effective alinement thereof with an unusual degree of accuracy.

And a still further object of this invention is to include in such a system component parts which are easily handled at all points, which reduce the problems of assembly in the field, as well as the inclusion of additional parts, and which facilitate replacement thereof, as maintenance requirements may dictate, in the system after it has been installed, all without necessitating the use of any specially designed or complicated tools or equipment.

Other objects of the present invention will be apparent from the following description, it being understood that the present invention consists substantially in the combination, construction, location and relative arrangement of parts, as described in detail hereinafter, as shown in the accompanying drawings and as finally pointed out in the appended claims.

In the accompanying drawings:

Figure 1 is a perspective view showing part of a three phase electric power conductor system which embodies the present invention.

Figure 2 is an enlarged sectional elevation through a hanger assembly, being taken generally on line 2—2 of Figure 1.

Figure 3 is a perspective view of the hanger assembly shown in Figure 2.

Figure 4 is a perspective view showing alined conductor sections joined together by a splice and bond assembly.

Figure 5 is a sectional elevation through a splice and bond assembly, or through a hanger assembly, being taken on line 5—5 of Figure 4 or Figure 10 and showing the condition of the parts before the locking screws are tightened.

Figure 6 is similar to Figure 5 but shows the condition of the parts after the locking screws are tightened.

Figure 7 is an enlarged sectional elevation similar to Figure 5, but omitting any showing of the locking screw.

Figure 8 is a perspective view showing a feeder connection or current tap assembly.

Figure 9 is a perspective view of a heavy duty hanger assembly for use at a point of anchorage.

Figure 10 is a perspective view of another hanger assembly for use at a point of anchorage; and Figure 11 is a perspective view of an expansion joint assembly.

Referring to the drawings, and particularly to Figure 1 thereof, it will be observed that the electric power conductor system of the present invention essentially comprises a series of conductor rails 10 carried by means including the hangers 11 which depend from a supporting structure indicated by the numeral 12, and which present the conductor rails 10 for engagement by the current collector elements 13 of a mobile unit indicated by the numeral 14.

The conductor rails 10 each comprise an elongated member made of nonmagnetic metal alloy, preferably an aluminum alloy, having a uniform transverse cross section. Each rail 10 is provided with a head part 15 and an integral additional part 16 depending therefrom. The rail head 15 is provided with a broad longitudinally extending top surface, and, in transverse cross section, this broad top surface of the rail head 15 includes a horizontal surface portion 17 flanked by surface portions 18—18 which slope downwardly and outwardly therefrom.

To provide for engagement with the current collector elements 13 of the mobile unit 14, the integral additional part 16 depending from the rail head 15 is provided with a broad longitudinally extending surface which presents downwardly, and, in transverse cross section, this downwardly presenting surface includes a pair of surface portions 19—19 which slope downwardly and outwardly in opposite directions from the center of the rail 10, being joined by a rounded surface portion 20 proximate the rail head 15 and being disposed at a right angle to one another.

To provide for engagement of an element under the rail head 15, the opposite side portions thereof are undercut for the full length of the rail, and, in transverse cross section, the surfaces presented by these undercuts each include a surface portion 21 parallel to the opposed surface portion 18 of the top surface of the rail head 15, a vertical surface portion 22, and a surface portion 23 generally parallel to the opposed surface portion 19 of the additional part 16 depending from the rail head 15. The rail head 15 is thus provided with undercut opposite side portions 24—24 which respectively overhang a pair of collector elements engaging legs 25—25 of the additional part 16, the portion 24 and the leg 25 on each side of the rail being disposed in outwardly diverging relation to one another. The lower edges of the legs 25—25 serve as drip edges for protecting the downwardly presenting surface comprising the surface portions 19—20—19 from rain water, etc. When compared to conductor rails made of steel, those of the present invention are small for a given electric current capacity, thus affording the advantage that they may be spaced closely together, a feature which makes for a compact installation which may be enclosed, when necessary, at a low cost.

For carrying the conductor rails 10, means are provided including the hanger assembly 11 which comprises an insulator of suitable material arranged for securement to a supporting structure and associated with a hanger section or head piece for supportingly engaging the conductor rail. The insulator is of conventional construction, being an elongated member 26 having an upper end portion conventionally secured to the supporting structure 12, as by a bolt 27.

The head piece is an elongated main body member 28 made of extruded aluminum alloy stock. This extruded head-piece is provided with a broad longitudinally extending base wall 29 and a pair of broad longitudinally extending spaced parallel walls 30—30 terminating in opposed inwardly projecting elements 31—31, being C-shaped in transverse cross section. The head piece 28 is normally disposed with the base wall portion 29 extending horizontally and the walls 30—30 depending therefrom, the walls 30—30 being positioned on the opposite sides of the rail head 15. The elements 31—31 respectively engage under the opposite side portions 24—24 of the rail head 15 and thus provides a seat for the rail head 15, the additional rail part 16 of the rail 10 being projected downwardly between the elements 31—31. It will be observed that the walls 30—30 of the head piece 28 are disposed respectively in slightly spaced relation to the proximate sides of the rail head 15, that each element 31 is disposed in slightly spaced relation to the opposed vertical surface portion 22 of the cut under rail head 15 and also to the proximate leg 25 of the additional rail part 16, as indicated in Figure 7. It should be apparent, therefore, that the rail 10 is received by the head piece 28 for relative axial sliding movement. In addition, the features just mentioned provide against binding of the parts and further provide for misalinement of the rail 10 and the head piece 28 by allowing for relative lateral and vertical shifting movement.

Referring particularly to Figure 10, it will be observed that the means for carrying the conductor rails 10 may include a hanger assembly 33 which also serves as a rail anchor. The hanger assembly 33 comprises an insulator 34 and a head piece 35. The former may be the same in every respect to the insulator 26 of the hanger 11, while the head piece 35 is made of a length of the same extruded stock as the head piece 28 of the hanger 11, being secured to the insulator 34 by a countersunk head screw (not shown).

For securing the rail 10 in the anchoring head piece 35 to prevent relative axial movement therebetween, the hanger 33 is provided with means operable for applying pressure upon the rail head 15 comprising an intermediate plate 36 and a pair of locking screws 37—37. The plate 36 is in the form of an elongated member made of a spring aluminum alloy, the same being disposed in underlying relation to the base wall portion of the head piece 35 and extending transversely thereof for confinement between the side-wall portions thereof. Referring particularly to Figure 5, it will be observed that the plate 36 is transversely arched and when properly placed in position so overlies the rail head 15 that only the extreme side edges thereof bear directly on the rail head 15. The screws 37—37, also made of an aluminum alloy, are received by tapped openings in the base wall portion 29 and project therethrough for engagement with the spring plate 36. When the screws 37—37 are tightened, the condition of the parts becomes as shown in Figure 6, where the under surface of the opposite side portions of the plate 36 are shown more or less fully engaged with the top surface portions 18—18 of the rail head 15. The plate 36 thus acts in the nature of a spring washer to secure the parts together against any tendency of the same to creep relatively to each other due to possible relaxation of one or more of the assembled parts in use thereof. The rail head 15 serves as a stop for the plate 36, preventing undue deflection due to pressure from the screws 37—37. The plate 36, as stated above, is disposed in underlying relation to the base wall portion 29 of the head piece 35, and is, therefore, protected thereby from moisture, etc. This protection may be increased by making the head piece 35 slightly longer than the plate 36, in which case the opposite end portions of the head piece 35 will respectively overhang the opposite end portions of the plate 36.

Referring particularly to Figure 9, the means for carrying the conductor rails 10 may also include a hanger assembly 38 which is similar to the hanger assembly 33 except that it utilizes a pair of insulators 34—34 and a set of three screws 37. Obviously, therefore, the hanger 38 is suited for use as a heavy duty rail anchor.

For charging the conductor rails 10 with electric power, each of them may be provided with a feeder connection assembly 39 that comprises a main body member 40 which is a section of the same extruded stock from which the head piece 28 of the hanger 11 is made and an electrical bonding plate 41 which is a section of the same plate stock from which the spring plate 36 of the hanger 33 is made. In order to secure the rail 10 and the main body member 40 against relative axial movement, the feeder assembly 39 is provided with means operably for applying pressure upon the rail head 15 comprising in addition to the plate 41, a set of four screws 37. It will be understood, of course, that the main body member 40, the bond plate 41 and the set of four screws 37 are assembled on the rail 10 generally as hereinbefore described with regard to the corresponding parts of the hanger 33. However, it should be noted that the screws 37 are disposed at one end of the main body member 40 in order to make the other end available for mounting a pair of conventional aluminum alloy or other suitable (e.g. copper) terminal fittings 42—42 for the cables 43—43, the base element 44 of each fitting 42 being secured to the main body member 40 by a pair of bolts 45—45 which project therethrough and thread into the base wall portion of the main body member 40. It should be noted further that the opposite edges of bond plate 41, when the latter is pressed into electrical contact with the rail 10 by the screws 37, as shown in Figure 8, wipe across the top surface portions 18—18 of the rail head 15 and so act to free the contacting surfaces from such objectionable foreign matter as might interpose resistance to the passage of current freely to the rail.

The rails 10 may be very long, and, in this event provision must be made for expansion and contraction thereof due to temperature changes. Referring particularly to Figure 11, it will be observed that there is provided for the mentioned purpose an expansion joint assembly 46 which comprises an assembly 47 that is identical to the feeder assembly 39 and an additional assembly 48 that is similar to the feeder assembly 39, being suitably modified to accommodate an insulator 34 disposed between the screws 37 and the terminal fittings 42—42. The assemblies 47 and 48 are mounted on the proximate end portions of a pair of adjoining rail sections, the end of the assembly 48 that carries the fittings 42—42 being positioned in longitudinal continuation of the rail section to which it is secured and in overlapping relation to the proximate end portion of the adjoining rail section, and the assembly 47 being positioned on the aforementioned adjoining rail section in spaced relation to the assembly 48. A pair of flexible cables 49—49 join the terminal fittings 42—42 of the assembly 47 respectively with the terminal fittings 42—42 of the assembly 48. It will be understood that the end of the assembly 48 that carries the terminal fittings 42—42, and the underlying end portion of the rail section to which the assembly 47 is secured are slidably engaged for relative axial shifting movement of the rail sections for accommodating expansion or contraction thereof, and that the rail 10 may be supported at the expansion joint assembly through the medium of the insulator 34, in which event the expansion joint assembly 46 also acts as a rail anchor for one of the rail sections. If desired, the expansion joint assembly may comprise, instead of an assembly 47 and an assembly 48, a pair of assemblies 47 or a pair of assemblies 48.

When the rails 10 are very long, provision must be made for mechanically splicing and electrically bonding adjoining rail sections. Referring particularly to Figure 4, it will be observed that there is provided for the purpose mentioned a splice and bond assembly 50 which comprises a main body member 51 that is a section of the same extruded stock from which the head piece 28 of the hanger 11 is made and a bond plate 52 which is a section of the same plate stock from which the plate 36 of the hanger 33 is made. In order to secure the adjoining rail sections and the main body member 51 against relative axial movement, the splice and bond assembly 50 is provided with means operable for applying pressure upon the rail head 15 comprising, in addition to the plate 52, a set of screws 37. It will be understood, of course, that the main body member 51, the bond plate 52 and the set of screws 37 are assembled on the rail 10 in bridging relation to the break between the proximate end portions of the adjoining rail sections. The main body member 51 and the bond plate 52 are each continuous members respectively directly in contact with side areas of the top surfaces and of the under surfaces of the rail heads 15—15 of adjoining rail sections. Consequently, the splice and bond assembly 50 provides a very effective means for mechanical connection and alinement of the adjoining rail sections and at the same time provides an efficient connection therebetween for conducting electric power, in fact, even more efficient than the rail itself. In this connection, it will be understood that wherever the intermediate spring plate is employed as a bonding element between the rail or rails and the head-piece associated therewith, the opposite edges of the intermediate plate wipe across and make intimate contact with the opposed top surface portions 18—18 of the rail to insure good electrical contact between the assembled parts.

In operation, the utilization of the devices hereinbefore described for operatively mounting the conductor rails 10 will depend upon such factors, as, for example, the character of the supporting structure, the length of the conductor rails 10, and the range of temperatures to which the system is to be subjected. Consequently, a particular system may require the use of all or less than all of these devices for mounting the conductor rails in a suitable manner.

It will be observed that numerous parts of the various devices hereinabove described are fabricated from the same basic stock. For example, the head pieces of the hangers 11, 33 and 38, the main body members of the feeder connection assembly 39, the expansion joint assembly 46 and the splice and bond assembly 50 are each fabricated from the same extruded stock. Furthermore, the intermediate spring plates employed in connection with the hangers 33 and 38, the feeder connection assembly 39, the expansion joint assembly 46 and the splice and bond assembly 50 are each fabricated from the same spring aluminum alloy plate stock. Each of these basic stock sections, in addition to that from which the rails 10 are made, may be extruded from a die, a method of production which is exceedingly convenient, accurate and cheap.

Due to the accuracy with which the basic stock sections are formed and the clamping action of the means hereinabove described for securing the rail sections together, etc., the latter may be alined with a degree of accuracy usually attained only by machining the component parts of a device before assembly.

The hanger 11 is operatively associated with the rail 10 by merely causing it to engage the rail head 15 and axially adjusting the hanger 11 and rail 10 as desired. The other devices described hereinabove for operatively mounting the rail 10 are operatively associated with the rail 10 by causing them to engage the rail head 10, axially adjusting them relative to the rail 10 as desired, and by then merely tightening the screws 37. It should be obvious therefore, that the conductor system of the present invention is designed with an eye to the reduction of field assembly problems.

In addition to the advantages already noted which are afforded by the use of aluminum or other extrudable nonmagnetic metal alloy, as compared to steel, it should be noted that the extruded metal conductor system of the present invention, due to its comparatively light weight, permits the use of insulators and other supporting structural elements that are smaller and cheaper than would be otherwise required. Such a system also saves the need for booster conductors and will operate under conditions which are unfavorable to steel or copper. Furthermore, such a system can be used advantageously where space is at a premium; where the system is used infrequently; to replace old systems using steel, especially to avoid the use of copper boosters or to increase current carrying capacity; to eliminate corrosion problems; and to prolong the life of the rail engaging shoes of collector elements.

It will be understood that the construction of the present invention, as herein illustrated and described, is susceptible of various changes and modifications which may be made from time to time without departing from the general principles or real spirit of the present invention, and it is accordingly intended to claim the same broadly, as well as specifically, as indicated in the appended claims.

What is claimed as new and useful is:

1. In apparatus of the character described, the combination comprising a longitudinally extending conductor rail having a main body portion of inverted V shape in transverse cross section to provide a pair of downwardly diverging side wall parts and a head portion integral with and extending transversely across the top ridge of said body portion to provide the latter with a pair of opposite projecting wing parts, an elongated rail-securing member of C-shape in transverse cross-section extending parallel to said rail including a base wall disposed in superposed spaced relation to said rail head and a pair of opposite side walls embracing therebetween said rail head, the bottom edges of said rail-head-embracing side walls being inwardly and upwardly turned to provide hook-like portions respectively underlying in face to face engagement with the opposite wing parts of the rail head and closely overlying the downwardly diverging side wall parts of said conductor rail of inverted V-shape, an elongated plate member extending parallel to said rail and interposed between the rail head and the overlying base wall of said rail-securing member, said plate member being a width approximately equal to that of the rail head and being further transversely arched to provide a pair of longitudinally extending opposite side portions downwardly inclined relatively to its central portion, the longitudinally extending marginal edge portions of said plate member being respectively seated upon the opposite wing parts of the rail head, said arched plate member having an inherent bias tending to urge the central portion thereof to normally assume a position raised above the rail head, and means operatively interposed between said rail-securing member and said plate member for pressing the central portion of the plate member toward said rail head against the inherent bias of the plate member to securely clamp together the rail and its securing member with the opposite side portions of the plate member respectively in substantial flat-wise engagement with the wing parts of the rail head.

2. In apparatus as defined in claim 1 wherein the oppositely extending wing parts and the downwardly diverging side wall parts of the rail head conjointly provide longitudinally extending grooves which present outwardly from opposite sides respectively of the rail head, and wherein the said hook-like portions of the rail-securing member are respectively nested in said grooves.

3. In apparatus as defined in claim 1 wherein the oppositely extending wing parts of the rail head are respectively downwardly inclined from opposite sides of the central portion of the rail head and are respectively disposed in spaced relation to the downwardly diverging side wall parts of the rail head.

4. In apparatus as defined in claim 1 wherein the transversely arched plate member includes a substantially flat central portion and a pair of substantially flat oppositely extending side portions respectively downwardly inclined relatively to the plane of the central portion in overlying relation to the oppositely projecting wing parts of the rail head.

5. In apparatus as defined in claim 1 wherein the means operative against the bias of the plate member to clamp the rail and its securing member together comprises axially adjustable screw elements projecting through the base wall of said rail-securing member and bearing against the central portion of the plate member.

6. In apparatus as defined in claim 1 wherein a pair of said rails extending in longitudinal alinement are clamped within a single one of said securing members bridging the proximate ends of said rails.

References Cited in the file of this patent

UNITED STATES PATENTS

| | | |
|---|---|---|
| 286,024 | Lange | Oct. 2, 1883 |
| 560,098 | Keithley | May 12, 1896 |
| 1,398,005 | Colabrese | Nov. 22, 1921 |
| 1,437,209 | Wenderhold | Nov. 28, 1922 |
| 1,741,804 | Zilliox | Dec. 31, 1929 |
| 1,945,332 | Robinson | Jan. 30, 1934 |
| 2,036,265 | Frank et al. | Apr. 7, 1936 |
| 2,200,448 | Holke | May 14, 1940 |
| 2,381,331 | Ayers | Aug. 7, 1945 |
| 2,515,484 | Zaleske | July 18, 1950 |
| 2,548,986 | Mayer | Apr. 17, 1951 |

FOREIGN PATENTS

| | | |
|---|---|---|
| 885,140 | France | May 17, 1943 |